(12) United States Patent
Sun et al.

(10) Patent No.: US 9,054,868 B2
(45) Date of Patent: *Jun. 9, 2015

(54) SYMBOL VECTOR MAPPING FOR CHASE-COMBINING HARQ

(71) Applicant: MARVELL WORLD TRADE LTD., St. Michael (BB)

(72) Inventors: Yakun Sun, Sunnyvale, CA (US); Jungwon Lee, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 118 days.

This patent is subject to a terminal disclaimer.

(21) Appl. No.: 13/867,487

(22) Filed: Apr. 22, 2013

(65) Prior Publication Data

US 2013/0235828 A1    Sep. 12, 2013

Related U.S. Application Data

(63) Continuation of application No. 12/488,240, filed on Jun. 19, 2009, now Pat. No. 8,428,161.

(60) Provisional application No. 61/077,773, filed on Jul. 2, 2008.

(51) Int. Cl.
*H04B 7/02* (2006.01)
*H04L 1/18* (2006.01)
(Continued)

(52) U.S. Cl.
CPC .............. *H04L 1/1812* (2013.01); *H04L 1/0618* (2013.01); *H04L 1/1822* (2013.01);
(Continued)

(58) Field of Classification Search
CPC ... H04L 1/0071; H04L 1/1812; H04L 1/0618; H04L 1/1816; H04L 27/2601; H04L 1/0625; H04L 1/1896; H04L 1/0001; H04L 1/1822; H04L 27/2602; H04L 1/1825; H04L 27/2608; H04L 1/189

USPC .......... 375/260, 264, 267, 299; 714/749, 748, 714/E11.113, E11.112
See application file for complete search history.

(56) References Cited

U.S. PATENT DOCUMENTS 7,397,864 B2    7/2008    Tarokh et al.
7,760,812 B2    7/2010    Liu et al.
(Continued)

FOREIGN PATENT DOCUMENTS

| EP | 1798926 A1 | 6/2007 |
|---|---|---|
| WO | WO-2007/123376 A2 | 11/2007 |
| WO | WO-2008/130188 A1 | 10/2008 |

OTHER PUBLICATIONS

International Search Report and Written Opinion for International Application No. PCT/US2009/047993, dated Nov. 5, 2009.
(Continued)

*Primary Examiner* — Rahel Guarino

(57) ABSTRACT

A method includes mapping, based on a first antenna mapping, a plurality of symbols to a plurality of antennas for transmitting a first data unit to a receiver, mapping, based on a first subcarrier mapping, the plurality of symbols to a plurality of subcarriers for transmitting the first data unit, and determining whether the receiver has successfully received the first data unit. The method also includes, in response to determining that the receiver has not successfully received the first data unit, (i) mapping, based on a second antenna mapping, the plurality of symbols to the plurality of antennas for transmitting a second data unit to the receiver, (ii) mapping, based on a different, second subcarrier mapping, the plurality of symbols to the plurality of subcarriers for transmitting the second data unit, and (iii) causing the second subcarrier mapping to be communicated to the receiver.

20 Claims, 6 Drawing Sheets

(51) Int. Cl.
   *H04L 1/06* (2006.01)
   *H04L 27/26* (2006.01)
   *H04B 7/04* (2006.01)
   *H04B 7/06* (2006.01)
   *H04L 1/00* (2006.01)

(52) U.S. Cl.
   CPC .......... *H04L 1/1896* (2013.01); *H04L 27/2608* (2013.01); *H04L 27/2602* (2013.01); *H04L 1/1825* (2013.01); *H04L 1/189* (2013.01); *H04B 7/0413* (2013.01); *H04B 7/0669* (2013.01); *H04L 1/0001* (2013.01); H04L 1/0625 (2013.01); H04L 1/1816 (2013.01); H04L 1/1893 (2013.01); H04L 27/2601 (2013.01)

(56) References Cited

U.S. PATENT DOCUMENTS

| | | | | |
|---|---|---|---|---|
| 8,064,428 B2* | 11/2011 | Bar-Ness et al. | ............ | 370/349 |
| 8,428,161 B2* | 4/2013 | Sun et al. | ............ | 375/260 |
| 2004/0199846 A1 | 10/2004 | Matsumoto et al. | | |
| 2006/0146692 A1 | 7/2006 | Gorokhov et al. | | |
| 2007/0201437 A1 | 8/2007 | Kim et al. | | |
| 2010/0014487 A1 | 1/2010 | Attar et al. | | |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std 802.16-2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, Oct. 1, 2004; 893 pages.

S. A. Mujtaba, "IEEE P802.11—Wireless LANs, TGn Sync Proposal Technical Specification," doc.: IEEE 802.11-04/0889r6, May 2005.

International Preliminary Report on Patentability for International Application No. PCT/US2009/047993, dated Jan. 5, 2011.

Non-Final Office Action in U.S. Appl. No. 12/488,240 dated Sep. 12, 2012.

Notice of Allowance in U.S. Appl. No. 12/488,240 dated Dec. 24, 2012.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).

IEEE 802.20-PD-06; IEEE P 802.20TMV14, Draft 802.20 Permanent Document; <System Requirements for IEEE 802.20 Mobile Broadband Wireless Access Systems—Version 14>, 24 pages (Jul. 16, 2004).

ITU-T Recommendation G.9960, "Unified high-speed wireline-based home networking transceivers—System architecture and physical layer specification," *Int'l Telecommunication Union*, pp. 1-160 (Dec. 2011).

ITU-T Recommendation G.9960, Erratum 1 to Recommendation ITU-T G.9960, *Int'l Telecommunication Union*, 1 page (Jul. 2012).

ITU-T Recommendation G.9960, Erratum 2 to Recommendation ITU-T G.9960, *Int'l Telecommunication Union*, 4 pages (Sep. 2012).

\* cited by examiner

SYMBOL VECTOR MAPPING FOR CHASE-COMBINING HARQ

CROSS REFERENCE TO RELATED APPLICATION

This application is a continuation of U.S. patent application Ser. No. 12/488,240, now U.S. Pat. No. 8,428,161, entitled "Symbol Vector Mapping for Chase-Combing HARQ," filed Jun. 19, 2009, and claims the benefit of U.S. Provisional Patent App. No. 61/077, 773 entitled "Symbol Vector Mapping for Chase-Combining HARQ," filed Jul. 2, 2008, the disclosure of which is hereby expressly incorporated herein by reference.

FIELD OF TECHNOLOGY

The present disclosure relates generally to communication systems in which devices transmit and receive data over multiple communication channels and, more particularly, to time-varying symbol vector mapping in such communication systems.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11g (2003), and the IEEE Standard 802.11n now in the process of being adopted, all of which are collectively incorporated herein fully by reference. These standards have been or are in the process of being commercialized with the promise of 54 Mbps or higher data rate, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Multiplexing (OFDM) encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective subcarrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned IEEE 802.11a/802.11g/802.11n standards as well as other standards such as the IEEE 802.16 Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned IEEE 802.11a/802.11g/802.11n and 802.16 standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconversion, conventional analog to digital conversion and Fast Fourier Transformation of the received time domain analog signal. Thereafter, the baseband processor performs frequency domain equalization (FEQ) and demodulation to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

To further increase the number of signals which may be propagated in the communication system and/or to compensate for deleterious effects associated with the various propagation paths, and to thereby improve transmission performance, it is known to use multiple transmit and receive antennas within a wireless transmission system. Such a system is commonly referred to as a multiple-input, multiple-output (MIMO) wireless transmission system and is specifically provided for within the IEEE 802.11n Standard. Further, the IEEE 802.16 Standard, or WiMAX, applies to cell-based systems and supports MIMO techniques. Generally speaking, the use of MIMO technology produces significant increases in spectral efficiency and link reliability of IEEE 802.xx and other systems, and these benefits generally increase as the number of transmit and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

In all communication systems discussed above, receivers sometimes fail to successfully receive data due to noise, interference, temporary resource failure, or other reasons. Accordingly, communication protocols typically support one or several error control methods to detect and compensate for transmission errors. A receiver may, for example, confirm that a data packet has been received and successfully decoded by sending a short acknowledgement message back to the transmitter. Additionally, the transmitter may start a timer upon sending a data packet and consider the data packet lost or undelivered if the transmitter does not receive an acknowledgement from the receiver before the timer expires. Some protocols additionally specify negative acknowledgements (NACKs) for acknowledging the receipt of a data packet while indicating that the data packet includes errors, for example.

In response to determining that the receiver did not properly receive the data packet, the transmitter typically retransmits the data packet immediately or after a certain controlled interval. This technique, generally known as Automatic Repeat Request (ARQ), includes multiple variants that limit the number of retransmissions or associate acknowledgments with frames rather than data packets, for example. In any ARQ technique, the receiver discards the defective data packet and does not generate a positive acknowledgement until it receives an acceptable copy of the data packet.

On the other hand, Hybrid Automatic Repeat Request (HARQ) techniques allow receivers to combine several defective copies of a data packet in an attempt to generate an acceptable version of the data packet. To this end, some HARQ recombining techniques such as Incremental Redundancy (IR), for example, require attaching different parity bits to the data packet during each retransmission to improve the chances of successfully combining defective copies into an acceptable version. The HARQ recombining technique known as Chase Combining, on the other hand, requires only that the same copy of the data packet be-transmitted and accordingly demands little computational complexity in recombining copies at the receiver. Because of its simplicity, Chase Combining HARQ is used in many systems such as WiMAX, Long Term Evolution (LTE), and other systems.

However, in OFDM and similar systems, Chase Combining HARQ frequently fails to generate an acceptable version of a transmitted data packet because interference or noise may corrupt the same bits in the data packet during each retransmission.

SUMMARY

In one embodiment, an apparatus for transmitting data via a plurality of antennas includes a space-time encoder configured to map, based on a first antenna mapping, a plurality of symbols to the plurality of antennas for transmitting a first data unit to a receiver, a symbol vector interleaver configured to map, based on a first subcarrier mapping, the plurality of symbols to a plurality of subcarriers for transmitting the first data unit, and a Hybrid Automatic Repeat Request (HARQ) controller configured to, subsequent to the first data unit being transmitted to the receiver, determine whether the receiver has successfully received the first data unit. In response to the HARQ controller determining that the receiver has not successfully received the first data unit, the HARQ controller is configured to (i) cause the space-time encoder to map, based on a second antenna mapping, the plurality of symbols to the plurality of antennas for transmitting a second data unit to the receiver, (ii) cause the symbol vector interleaver to map, based on a second subcarrier mapping, the plurality of symbols to the plurality of subcarriers for transmitting the second data unit, wherein the second subcarrier mapping is different than the first subcarrier mapping, and (iii) cause the second subcarrier mapping to be communicated to the receiver.

In another embodiment, a method for transmitting data via a plurality of antennas includes mapping, based on a first antenna mapping, a plurality of symbols to the plurality of antennas for transmitting a first data unit to a receiver, mapping, based on a first subcarrier mapping, the plurality of symbols to a plurality of subcarriers for transmitting the first data unit, and, subsequent to the first data unit being transmitted to the receiver, determining whether the receiver has successfully received the first data unit. The method also includes, in response to determining that the receiver has not successfully received the first data unit, (i) mapping, based on a second antenna mapping, the plurality of symbols to the plurality of antennas for transmitting a second data unit to the receiver, (ii) mapping, based on a second subcarrier mapping, the plurality of symbols to the plurality of subcarriers for transmitting the second data unit, wherein the second subcarrier mapping is different than the first subcarrier mapping, and (iii) causing the second subcarrier mapping to be communicated to the receiver.

In another embodiment, a nontransitory, tangible computer-readable storage medium stores instructions that, when executed by one or more processors, cause the one or more processors to map, based on a first antenna mapping, a plurality of symbols to a plurality of antennas for transmitting a first data unit to a receiver, to map, based on a first subcarrier mapping, the plurality of symbols to a plurality of subcarriers for transmitting the first data unit, to determine whether the receiver has successfully received the first data unit; and, in response to determining that the receiver has not successfully received the first data unit, to (i) map, based on a second antenna mapping, the plurality of symbols to the plurality of antennas for transmitting a second data unit to the receiver, (ii) map, based on a second subcarrier mapping, the plurality of symbols to the plurality of subcarriers for transmitting the second data unit, wherein the second subcarrier mapping is different than the first subcarrier mapping, and (iii) cause the second subcarrier mapping to be communicated to the receiver.

DETAILED DESCRIPTION

Figure 1A:
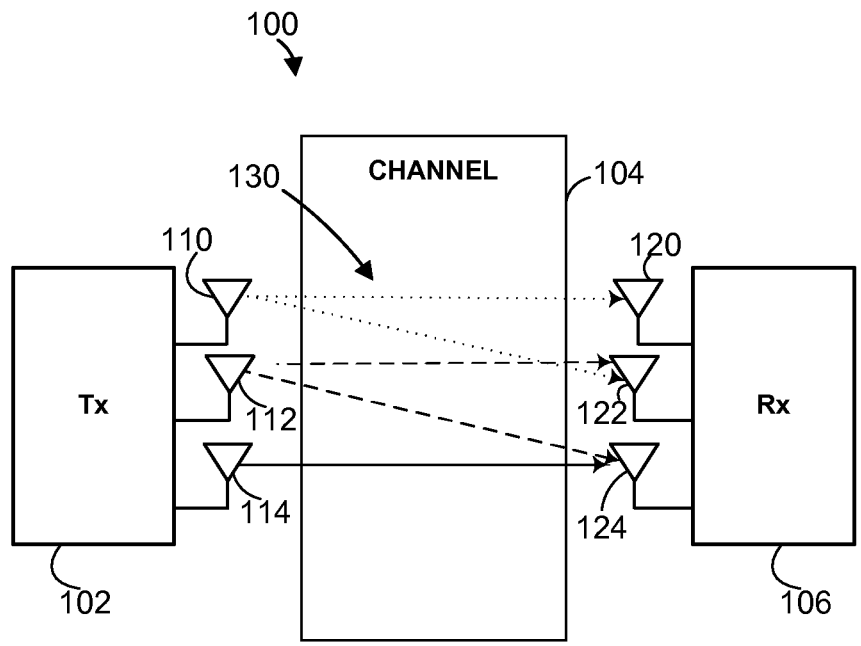
FIG. 1A illustrates a MIMO communication system including a transmitter and a receiver.

FIG. 1A is a block diagram illustrating an example wireless communication system 100 in which a transmitting device 102 transmits information over a wireless communication channel 104 to a receiving device 106. Each of the devices 102 and 106 may be a base station or a mobile station equipped with a set of antennas 110-114 and 120-124, respectively. Further, the communication channel 104 includes a plurality of subcarriers $C_1, C_2, \ldots C_5$, each associated with a particular frequency at which the devices 102 and 106 may communicate. The antennas 110-114 and 120-124 define multiple spatial streams 130 within the wireless communication channel 104 during operation of the devices 102 and 106. In general, the wireless communication system 100 may include any number of devices, each equipped with the same or a different number of antennas such as 1, 2, 3, 4, . . . . The wireless communication system 100 may also include any number of subcarriers. In the embodiment illustrated in FIGS. 1A and B, the wireless communication system 100 uses an OFDM technique and the subcarriers $C_1, C_2, \ldots C_5$ are accordingly selected to be mutually orthogonal (i.e., to minimize cross-talk between each pair of subcarriers). However, the wireless communication system 100 could also use any other FDM technique. It will be also noted that while the example wireless communication system 100 is a MIMO system, at least some of the methods and apparatus for time-varying symbol vector mapping discussed herein may be similarly applied to single-antenna transmitters and receivers.

Figure 1B:
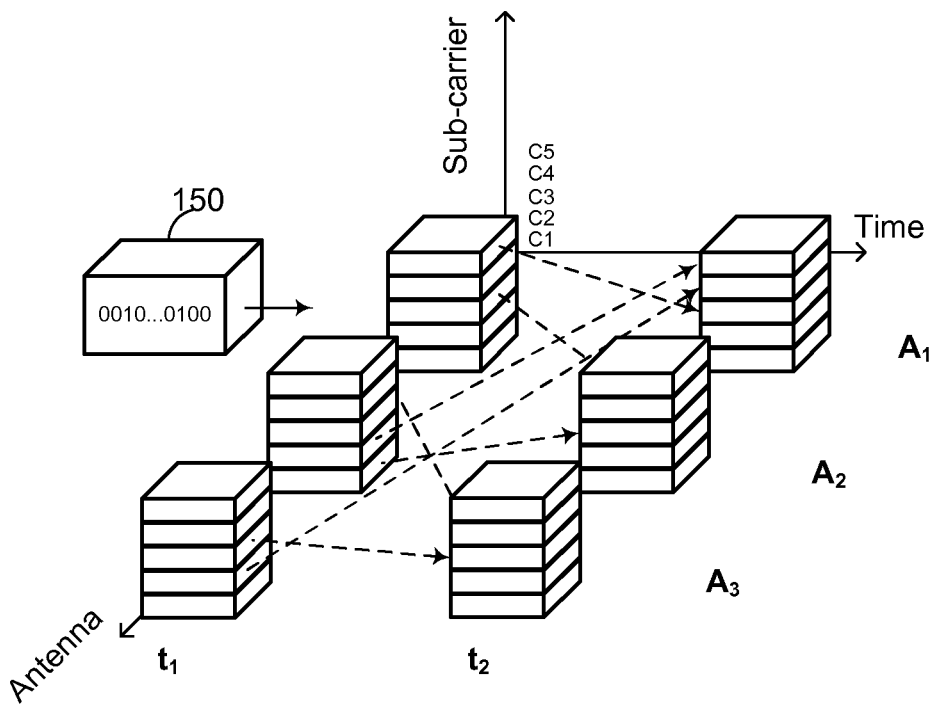
FIG. 1B schematically illustrates an application of time-varying symbol vector mapping for chase-combining HARQ.

Referring also to FIG. 1B, in operation, the transmitting device 102 may send a data packet 150 to the receiving device 106 at a time $t_1$. To this end, the transmitting device 102 may first convolutionally encode the bits of the data packet to generate n bits $B_1, B_2, \ldots B_n$, including the information payload and parity data, or apply any other suitable error encoding technique to encode the data packet. The transmitting device 102 may then map the bits $B_1, B_2, \ldots B_n$ to m symbols $S_1, S_2, \ldots S_m$ using Quadrature Phase-Shift Keying (QPSK), for example, or any suitable modulation technique including those known in the art. Next, the transmitting device 102 may map the symbols $S_1, S_2, \ldots S_m$ to the subcarriers $C_1, C_2, \ldots C_5$ and to the antennas 110-114 as a mapping pattern $M_1$ and transmit the symbols $S_1, S_2, \ldots S_m$, as a particular symbol vector, via the communication channel 104 according to the mapping pattern $M_1$.

The receiving device 106 receives the symbols $S_1, S_2, \ldots S_m$ as $S_1', S_2', \ldots S_m'$. The receiving device 106 may detect one or more errors in the symbols $S_1', S_2', \ldots S_m'$ or in corresponding received bits $B_1', B_2', \ldots B_n'$ and accordingly transmit a negative acknowledgment (NACK) to the transmitting device 102. Meanwhile, the receiving device 106 may retain the symbols $S_1', S_2', \ldots S_m'$ and/or the bits $B_1', B_2', \ldots B_n'$ in a memory such as RAM, for example. In response to the NACK, the transmitting device 102 may generate a new mapping pattern $M_2$ of the symbols $S_1, S_2, \ldots S_m$ to the subcarriers $C_1, C_2, \ldots C_5$ and/or to the antennas 110-114, and re-transmit the symbols $S_1, S_2, \ldots S_m$ at a time $t_2$. The mapping pattern $M_2$ may be different from mapping pattern $M_1$ in subcarrier assignment, antenna assignment, or both. The retransmitted symbols may be received by the receiving device 106 as symbols $S_1'', S_2'', \ldots S_m''$. When de-interleaving the received symbols, the receiving device 106 may apply a corresponding mapping pattern to the received symbols $S_1'', S_2'', \ldots S_m''$ or, when the mapping patterns $M_1$ and $M_2$ differ only in spatial assignment, the receiving device 106 need not take any action at all to account for the difference between the mapping patterns $M_1$ and $M_2$. As discussed in detail below, this method of remapping symbols in response to failed transmissions improves the overall reliability and throughput of the wireless communication system 100 by increasing the probability of successfully assembling an acceptable copy of the data packet 150 at the receiving device 106 after one or more re-transmissions of the data packet 150, particularly if the quality of the subcarriers $C_1, C_2, \ldots C_5$ changes only slowly with time. Moreover, symbol mapping described herein requires little complexity to more fully exploit frequency selectivity, spatial diversity, or both in the wireless communication system 100.

Figure 2:
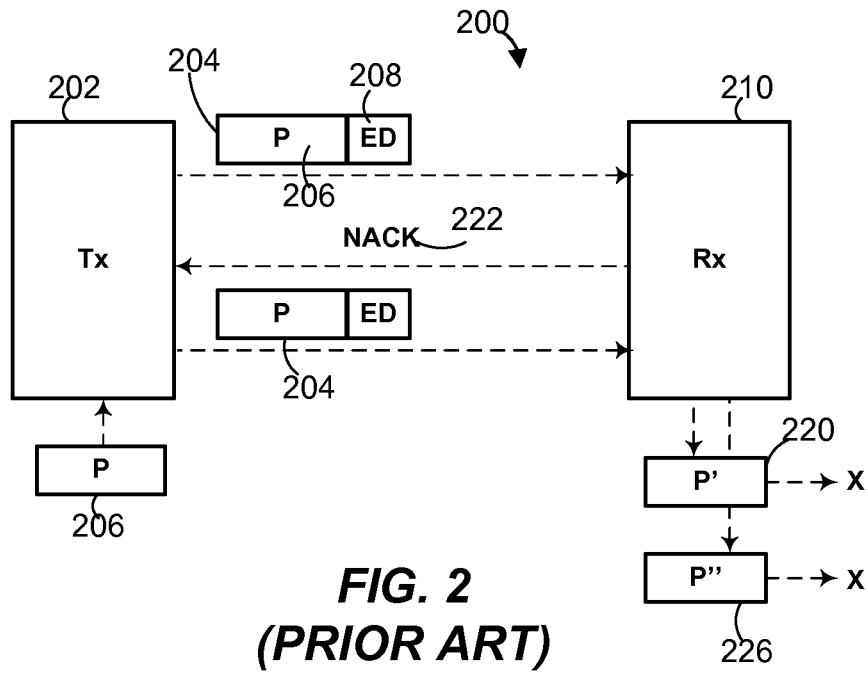
FIG. 2 is a block diagram that schematically illustrates an application of a known Automatic Repeat Request (ARQ) technique.
Figure 3:
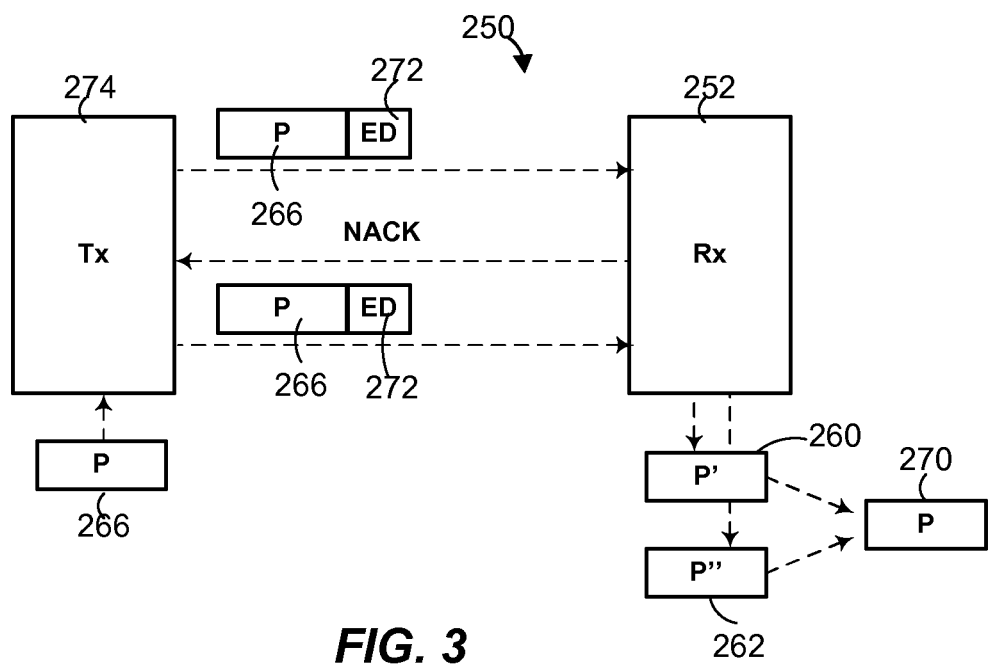
FIG. 3 is a block diagram that schematically illustrates an application of a known Hybrid Automatic Repeat Request (HARQ) technique.

Next, FIGS. 2 and 3 schematically illustrate the respective operations of known ARQ and HARQ error control methods. FIGS. 2 and 3 are included to help explain the methods and devices for time-varying symbol vector mapping discussed with reference to FIGS. 1A and B and FIGS. 4-7. Several embodiments of transmitter and receiver architectures that may implement symbol mapping are then discussed with reference to FIGS. 4 and 5. Finally, example methods for symbol mapping for a transmitter and a receiver, respectively, are illustrated as flowcharts in FIGS. 6 and 7.

Referring to FIG. 2, a transmitter 202 of an example prior art ARQ system 200 sends a data packet 204, including an information payload 206 and several parity bits 208 which may be used for error detection (ED), for example, to a receiver 210. According to one possible approach, the transmitter 202 applies a cyclic redundancy check (CRC) function to the information payload 206 to generate a relatively short sequence of parity bits 208. The informational payload 206 may arrive at the receiver 210 as a copy 220, which may include errors due to the interference in the communication channel. In general, the communication channel may be wireless, wired, fiber-optical, etc. To determine whether the copy 220 includes errors, the receiver 210 verifies the checksum of the data packet 206 using the parity bits 208. In particular, the receiver 210 applies the CRC function to the information payload in the copy 220, generates another version of the short sequence of bits, and compares the generated version to the sequence included in the copy 220 (as the parity bits 208). If the two versions of the parity bits 208 are different, this indicates one or more errors in the copy 220.

Thus, using the parity bits 208, the receiver 210 may evaluate the copy 220, determine that the copy 220 includes errors, send a negative acknowledgement 222 to the transmitter 202, and discard the copy 220. Next, the transmitter 202 may re-send the data packet 204 with parity detection bits 208 or, alternatively, with new parity bits based on a different algorithm, for example. In either case, the receiver 202 will attempt to extract the payload 206 from a second received copy 226. The transmitter 202 and the receiver 210 may thus exchange any number of copies of the data packet 204 and negative acknowledgements 222 prior to successfully completing the session or encountering a time or count limit specified by a communication protocol.

Referring now to FIG. 3, a communication system 250 supporting a HARQ scheme allows a receiver 252 to merge copies 260 and 262 of a data payload 266 into a combined copy 270 in contrast to the scheme describe with respect to FIG. 2. The parity bits 272 that a transmitter 274 sends with the data payload 266 may vary with each transmission or remain the same. In the case of Chase Combining, for example, the transmitter 274 sends the same parity bits 272 along with the same data payload 266. When the copies 260 and 262 are not identical, the receiver 252 may sometimes recover most if not all of the data payload 266. Moreover, by combining the copies 260 and 262 with a third received copy (not shown), the receiver 252 may further increase the chances of recovering the data payload 266 in the presence of noise and/or interference on the communication channel.

The Chase Combining variant of HARQ described with reference to FIGS. 1A and B may improve the reliability of OFDM communications between the transmitter 102 and the receiver 106. However, in many situations, the quality of subcarriers $C_1, C_2, \ldots C_5$ of the communication channel 104 changes relatively slowly with time. For example, the received signal associated with the subcarrier $C_1$, may be relatively low at the time $t_1$ and only a little stronger at a time $t_2$. In other words, the Signal-to-Noise ratio (SNR) of the subcarrier $C_1$ may be relatively low at times $t_1$ and $t_2$. Meanwhile, the received signal associated with the subcarrier $C_3$ may be relatively strong both at the time $t_1$ and at the time $t_2$. As a result, a symbol may fail to successfully propagate via the subcarrier $C_1$ after two attempts while another symbol may successfully propagate both times via the subcarrier $C_3$ according to the known Chase Combining HARQ approach (FIG. 3). On the other hand, if the devices 102 and 106 use the time-varying symbol vector mapping techniques discussed herein, the higher SNR of the subcarrier $C_3$ at the times $t_1$ and $t_2$ can be more fully exploited. More specifically, in one embodiment, the transmitting device 102 may transmit a certain symbol via the subcarrier $C_1$ at the time $t_1$ and re-transmit the same symbol via the subcarrier $C_3$ at the time $t_2$. Because of the substantial difference in channel quality between subcarriers $C_1$ and $C_3$, the probability that the receiving device 106 will successfully receive the symbol is significantly higher.

Figure 4:
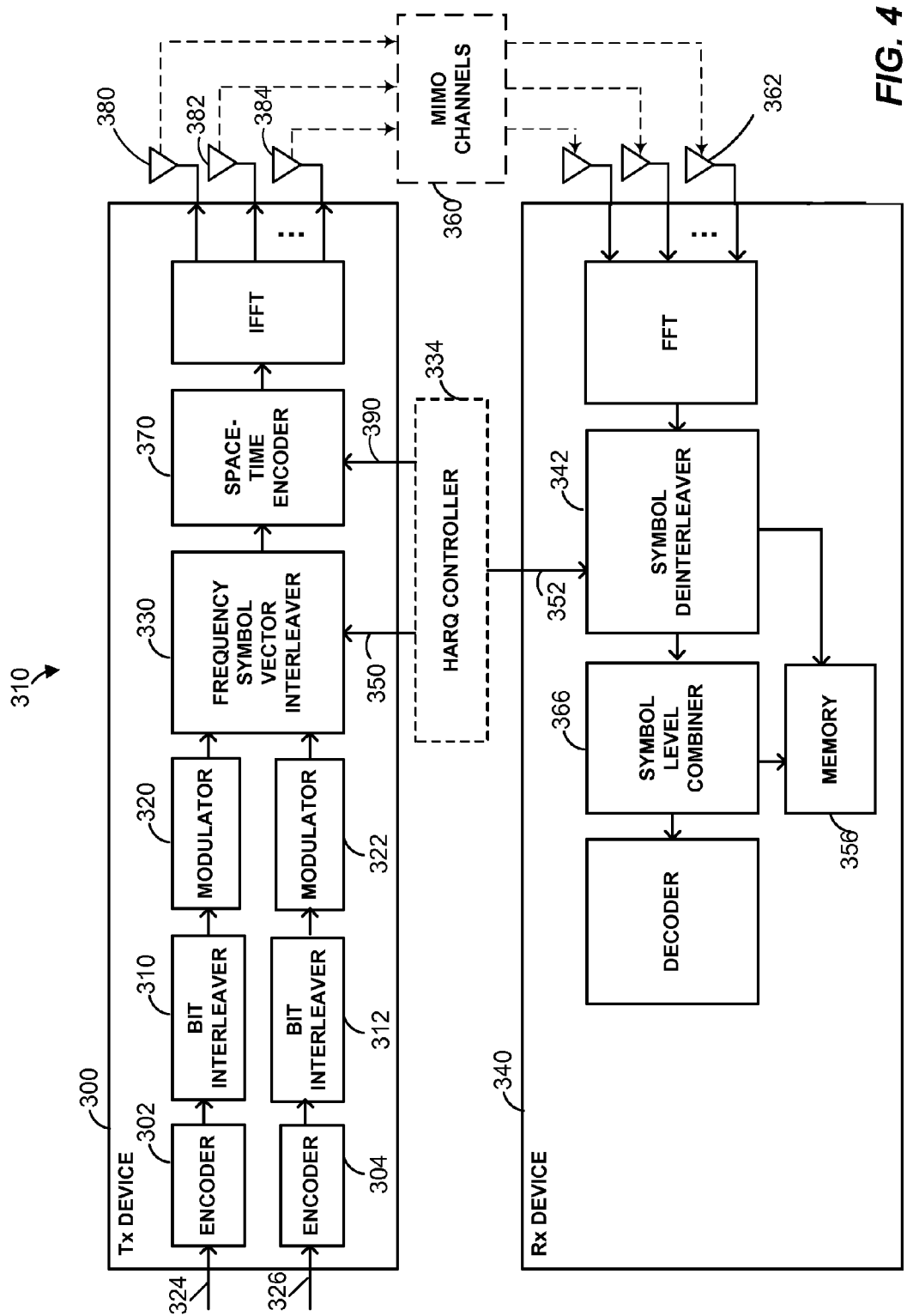
FIG. 4 is a block diagram of an example communication system in which a transmitter and a receiver utilize time-varying symbol vector mapping for chase-combining HARQ.

Now referring to FIG. 4, a transmitter 300 and a receiver 340 operate in a wireless MIMO communication system 310 that supports at least some of the example time-varying symbol vector mapping techniques described in the present disclosure. The example transmitter 300 includes encoders 302 and 304, interleavers 310 and 312, and modulators 320 and 322, corresponding to respective encoder chains. In other embodiments of the transmitter 300, there may be a single encoder chain or, conversely, more than two encoder chains.

The encoders 302 and 304 may perform error correcting encoding of a sequence of bits supplied via a respective input 324 or 326. For the purposes of clarity and conciseness, such sequences of bits are referred to herein as "data packets." However, it will be noted that the transmitter 300 may support packet-, frame-, stream-oriented, etc. communication protocols, and the systems of FIGS. 1A and B, 4, and 5 support symbol vector mapping techniques applicable to packets, frames, streams, or any other types of logical grouping of informational bits. Thus, the term "data packet" may refer to any contiguous block of information to be transmitted to a receiver. With continued reference to FIG. 4, the encoders 302 and 304 may generate redundant error correction information as a part of a Forward Error Correction (FEC) strategy, for example, or apply any other desired form of encoding to the data packet supplied to the encoders. The bit interleavers 310 and 312, which in some embodiments may be integral with the corresponding encoders 302 and 304, may further arrange the bits corresponding to the data packet for optimal transmission.

Next, the bit interleavers 310 and 312 may supply the encoded and interleaved bits to the modulators 320 and 322 for bit-to-symbol mapping. In general, the transmitters and receivers in the wireless communication systems 100 or 310 may be capable of using a variety of modulation schemes. For example, some modulation schemes may provide a higher bit rate than other schemes (e.g., 64-QAM vs. 16-QAM). Typically, modulation schemes that provide a higher bit rate may be more sensitive to channel impairments as compared to modulation schemes with a lower bit rate. In the particular example illustrated in FIG. 4, the modulators 320 and 322 use the QPSK scheme to define four symbols as distinct signal constellation points, each corresponding to a two-bit value. Thus, the symbols may be of a higher dimension than binary values. Upon receiving a sequence of bits, the modulators 320 and 322 generate respective sequences of symbols and supply these sequences to a frequency symbol vector interleaver 330.

As described with respect to FIGS. 1A and B, a transmitter (such as the transmitter 300) generally applies a different mapping pattern $M_n$ for each retransmission $R_n$ of a data packet. The frequency symbol vector interleaver 330 in the embodiment of FIG. 4 generates a different subcarrier assignment or mapping pattern $M_F^n$ for the re-transmission $R_n$ of the symbols received from the modulators 320 and 322 (each mapping pattern $M_F^n$ specifies the mapping of symbols, corresponding to a certain data unit, to a frequency set F of the frequencies of sub-carriers $C_1$, $C_2$, etc. during the nth transmission of the data unit). In this manner, the transmitter 300 effectively directs a symbol to a different communication stream during a retransmission. In other embodiments or modes of operation discussed below, a transmitter may also generate different antenna mapping pattern $M_A^n$ during the re-transmission $R_n$ or, in yet other embodiments, the transmitter may rotate symbols in both frequency and space to generate different time-dependent frequency and antenna mapping patterns $M_{F,A}^n$ (each mapping pattern $M_A^n$ specifies the mapping of symbols, corresponding to a certain data unit, to an antenna set A during the nth transmission of the data unit, and each mapping pattern $M_{F,A\ hu\ n}$ specifies the mapping of symbols, corresponding to a certain data unit, to a frequency set F and an antenna set A during the nth transmission of the data unit). Retransmitted symbols thus travel via different communication streams during some or all retransmission attempts, with communication streams varying in frequency, space, or both.

As illustrated in FIG. 4, the wireless communication system 310 may include a HARQ controller 334 to control retransmissions $R_n$ and, in at least some embodiments, to coordinate the application of mapping patterns $M_F^n$ between the transmitter 300 and a receiver 340. Additionally, the HARQ controller 334 may receive transmission failure indications from higher levels of packet processing architecture, for example. A transmission failure indication may identify a data packet that failed to arrive at the destination correctly, for example. The HARQ controller 334 may be a virtual software component distributed among the frequency symbol vector interleaver 330 of the transmitter 300 and a symbol deinterleaver 342 of the receiver 340, for example. In other embodiments, each of the transmitter 300 and the receiver 340 may include a separate HARQ controller module co-operating with the respective module 330 or 342 as hardware, software, firmware, or a combination thereof. During operation, the HARQ controller 334 may maintain a retransmission count for each data packet and, optionally, may maintain some or all of the corresponding mapping patterns $M_F^n$. In other embodiments, the HARQ controller 334 may communicate the particular mapping pattern $M_F^n$ used by the transmitter 300 to the receiver 340.

To consider one specific example of operation of the wireless communication system 310, the frequency symbol vector interleaver 330 may receive from the modulator 320 an encoded and modulated representation of a data packet as a group of symbols $\{S_1, S_2, \ldots S_m\}$. The frequency symbol vector interleaver 330 may map $S_1$ to $C_1$, $S_2$ to $C_2$, ..., and $S_m$ to $C_m$ when making the first attempt to transmit the symbols (for the purposes of clarity, it is assumed that the number of subcarriers available in the wireless communication system 310 is greater or equal to m). During the second attempt, the frequency symbol vector interleaver 330 may apply a reverse order of mapping to assign $S_1$ to $C_m$, $S_2$ to $C_{m-1}$, ..., and $S_m$ to $C_1$. Alternatively, the frequency symbol vector interleaver 330 may swap subcarrier assignments for each pair of adjacent symbols ($S_1$ to $C_2$, $S_2$ to $C_1$, etc.). As yet another alternative, the frequency symbol vector interleaver 330 may apply one of a predetermined set of mapping patterns. In general, the frequency symbol vector interleaver 330 may apply any desired set of mappings.

To properly de-interleave the received symbols, the receiver 340 may store a matching set of pre-determined mapping patterns or, if the frequency symbol vector interleaver 330 applies a certain algorithm using programmable or hardware means, the receiver 340 may be configured with a corresponding algorithm. As follows from the discussion above, the receiver 340 may receive copies of the symbol $S_1$ via different subcarriers during different transmission attempts, and thus must be able to properly match copies of the same symbols received via different subcarriers. Alternatively, the transmitter 300 may communicate the mapping applicable to a particular re-transmission before or during the actual re-transmission to the receiver 340 or, as yet another alternative, may communicate the identity of one of a pre-defined set of mapping patterns. The HARQ controller 334 coordinates the mapping of symbol vectors to subcarriers or frequencies to ensure that the transmitter 300 and the receiver 340 apply the same mapping scheme for a particular transmission or re-transmission. FIG. 4 schematically illustrates the interaction between the modules 330, 334, and 342 described above as control connections 350 and 352.

Upon receiving multiple copies of a data packet and storing the multiple copies in a memory 356 (e.g., a random access memory (RAM)) in accordance with the HARQ scheme, the receiver 340 may merge the received copies using one of a variety of suitable techniques such as combining the received data on the bit level or the symbol level. For example, the transmitter 300 may receive a particular signal $y_1$ at the time $t_1$ at an antenna 362. According to a mapping pattern $M_f^1$, the symbol $s_1$ corresponding to a two-bit value $b_1 b_0$ travels via a channel $h_1$ of the sub-carrier $C_1$ associated with noise $z_1$:

$$y_1 = h_1 s_1 + z_1 \quad \text{(Equation 1)}$$

The receiver 340 may use the received signal y, and the available knowledge of the channel (in this case, the channel corresponding to the sub-carrier $C_1$) and/or noise to derive an estimated symbol $\hat{s}_1$ of the transmitted symbol. The estimated symbol $\hat{s}_1$ corresponds to an estimated bit tuple $\hat{b}_1 \hat{b}_0$.

During a first retransmission at the time $t_2$, the symbol $s_1$ may travel via a channel $h_5'$ of the sub-carrier $C_5$ associated with noise $z_5$ according to the mapping pattern $M_f^2$:

$$y_1' = h_5' s_1 + z_5 \quad \text{(Equation 2)}$$

An estimated symbol $\hat{s}_1'$ (derived from $y_1'$) accordingly corresponds to an estimated bit tuple $\hat{b}_1' \hat{b}_0'$.

In single-antenna embodiments of the wireless system 310, the receiver 340 may implement bit-level data combination. In particular, the receiver 340 may separately calculate an estimate for each received bit using the log-likelihood ratio (LLR) approach or any other suitable technique. As is known, LLR is a statistical algorithm which, when applied to signal transmissions, yields a probable value of a transmitted symbol from a known dictionary of symbols. In this case, the receiver 340 may use Chase Combining to obtain an estimate $\hat{b}_1^c \hat{b}_0^c$ of the received bits $\hat{b}_1 \hat{b}_0$ as follows:

$$\hat{b}_1^c = LLR(\hat{b}_1) + LLR(\hat{b}_1'); \text{ and} \quad \text{(Equation 3)}$$

$$\hat{b}_0^c = LLR(\hat{b}_0) + LLR(\hat{b}_0'), \quad \text{(Equation 4)}$$

where LLR(x) corresponds to a result of applying LLR algorithm to x.

If, however, the transmitter 300 and the receiver 340 use multiple antennas to define a MIMO communication scheme via a shared channel 360 as illustrated in FIG. 4, the wireless communication system 310 may support symbol-level data combining to improve efficiency and reliability. It will be noted, however, that MIMO embodiments of the wireless communication system 310 may similarly support bit-level data combining, and single-antenna embodiments of the wireless communication system 310 may also support symbol-level data combining. To continue with the example discussed above, a symbol level combiner 366 of the receiver 340 may derive an estimate $\hat{s}_1^c$ of the received symbol using a symbol-level combination function $F_{comb}$ to implement symbol-level combining:

$$\hat{s}_1^c = F_{comb}(\hat{s}_1, \hat{s}_1') \quad \text{(Equation 5)}$$

Upon calculating the estimated symbol $\hat{s}_1^c$, the receiver 340 may map the symbol $\hat{s}_1^c$ to a corresponding bit tuple:

$$\hat{s}_1^c \rightarrow \hat{b}_1^c \hat{b}_0^c \quad \text{(Equation 6)}$$

Thus, the wireless communication systems 310 and 100 may use symbol-level encoding with Chase Combining HARQ methods to efficiently generate an estimate of a received symbol based on two or more copies of the transmitted symbol. It will be appreciated that because the transmitter and receiver architectures illustrated in FIG. 4 do not require different modulation (i.e., different bit-to-symbol mapping) at retransmissions, symbol-level combining at the receiver 340 can operate in the same exact manner irrespective of the particular mapping pattern $M_F^n$.

With continued reference to FIG. 4, a space-time encoder 370 maps the symbols $\{S_1, S_2, \ldots S_m\}$ to antennas 380, 382, and 384 according to a mapping pattern $M_A^n$. In some embodiments, the transmitter 300 may re-arrange symbol vectors in frequency domain as well as in space domain for some or all retransmissions according to frequency-antenna mapping patterns $M_{F,A}^n$. The HARQ controller 334 may optionally coordinate the mapping with the space-time encoder 370 via a control input 390. To better illustrate spatial symbol vector mapping, FIG. 5 illustrates another embodiment of a transmitter architecture 400 which may be used with a transmitter operating in a wireless communication system similar to the system 310, for example, or any other MIMO communication system.

Importantly, the transmitter architecture 400 allows MIMO systems to use some of the time-varying symbol vector mapping techniques without requiring any changes to the existing receiver architecture. As discussed below, the receivers may perceive the effect of applying spatial time-varying symbol vector mapping as physical changes in communication streams, i.e., in the SNR qualities of the corresponding subcarriers. In this sense, the transmitter architecture 400 allows communicating devices to artificially change the channel or at least some of the subcarriers when actual physical changes in the channel occur relatively slowly.

Figure 5:
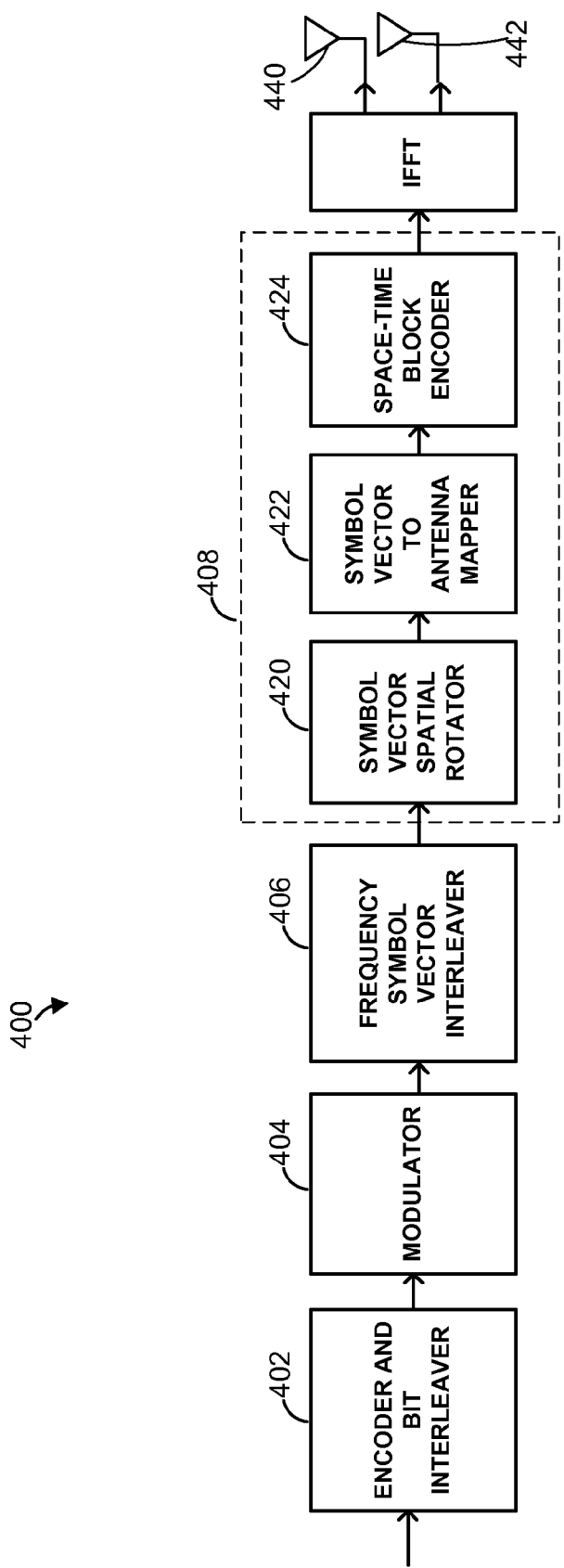
FIG. 5 is a block diagram of another example of a transmitter that utilizes time-varying symbol vector mapping for chase-combining HARQ.

As illustrated in FIG. 5, the transmitter architecture 400 includes, in part, an encoder and bit interleaver 402, a modulator 404, and a frequency symbol vector interleaver 406. The components 402, 404 and 406 are generally similar to the corresponding devices 302, 310, 320, and 330 illustrated in FIG. 4. However, the example transmitter architecture 400 does not apply time-varying frequency symbol mapping to the sequences of symbols received from the modulator 404. In other words, $M_F^n = M_F^{n+1}$ for all HARQ retransmissions of a certain symbol. The space-time coder 408 may include a symbol vector spatial rotator 420, a symbol vector to antenna mapper 422, and a space-time block encoder 424. In operation, the symbol vector spatial rotator 420 may rotate or otherwise modify symbol vectors so that the symbol vector to antenna mapper generates a different symbol-to-antenna assignment or mapping pattern $M_A{}^n$ for each retransmission. For example, the mapping pattern $M_A{}^1$ may assign odd symbols $\{S_1, S_3, \ldots S_{m-1}\}$ to an antenna 440 and the even symbols $\{S_2, S_4, \ldots S_m\}$ to an antenna 442. During the next retransmission, the mapping pattern $M_A{}^2$ may conversely assign odd symbols $\{S_1, S_3, \ldots S_{m-1}\}$ to the antenna 442 and the even symbols $\{S_2, S_4, \ldots S_m\}$ to the antenna 440.

Similar to time-varying frequency symbol vector mapping discussed above, the symbol vector spatial rotator 420 and/or the symbol vector to antenna mapper 422 may generate any desired number of permutations allowed by the number of available antennas. If desired, the modules 420 and 422 may monitor the performance of the corresponding communication system to apply adaptive mapping techniques. Referring back to FIG. 1A, the antennas 110-114 may define different numbers of spatial communication streams 130 in various embodiments or configurations of the devices 102 and 106. Typically, the number of spatial communication streams associated with a shared communication channel (such as the channel 104) is less than or equal to the number of transmit antennas. Each of the spatial communication streams 130 may be associated with some or all of the subcarriers $C_1$, $C_2$, etc. As is known, MIMO transmitters may simultaneously transmit from multiple antennas via the same subcarrier. Irrespective of a particular symbol to frequency mapping, however, modifying symbol to antenna mapping enables symbols to travel along different propagation paths during distinct retransmission attempts. As a result, the probability that a symbol retransmitted via the same subcarrier during the second, third, etc. attempt significantly increases due to the different in spatial propagation path. As noted above, this feature of the transmitter architecture 400 is particularly useful when the communication channel 104 changes only slowly.

Referring again to FIG. 5, because a transmitter consistent with the architecture illustrated in FIG. 5 does not modify symbol to frequency mapping, the corresponding receiver need not adjust for time-varying spatial symbol vector mapping at all. Instead, the receiver will see the symbol $s_1$ as traveling, for example, via a channel $h_3$ with a fast-changing SNR and associated with noise $z_3$:

$$y_1 = h_3 s_1 + z_3 \quad \text{(Equation 7)}$$

$$y_1' = h_3' s_1 + z_3', \quad \text{(Equation 8)}$$

where $y_1$, $h_3$, and $z_3$ represent the values at time $t_1$, and $y_1'$, $h_3'$, and $z_3'$ represent the respective values at time $t_2$.

The receiver may combine the received copies at the bit level or the symbol level, for example, using the Chase Combining HARQ approach or another technique. In another embodiment, the system of FIG. 5 additionally uses time-varying frequency symbol mapping.

Further with respect to FIGS. 4 and 5, the components or modules 302, 304, 310, 312, 320, 322, 330, 342, 366, 370, and 402-424 may be implemented as hardware, a processor executing software instructions, a processor executing firmware instructions, or a combination thereof. For example, some or all of the components may be custom integrated circuits, application-specific integration circuits (ASICs), etc., communicatively coupled by electrical busses. In some cases, the receiver and transmitters optionally may include bypass busses (not shown) to bypass some of the components if the currently active MIMO mode does not require certain operations, such as processing multiple presentations of a symbol encoded according to a space-time encoding scheme.

Figure 6:
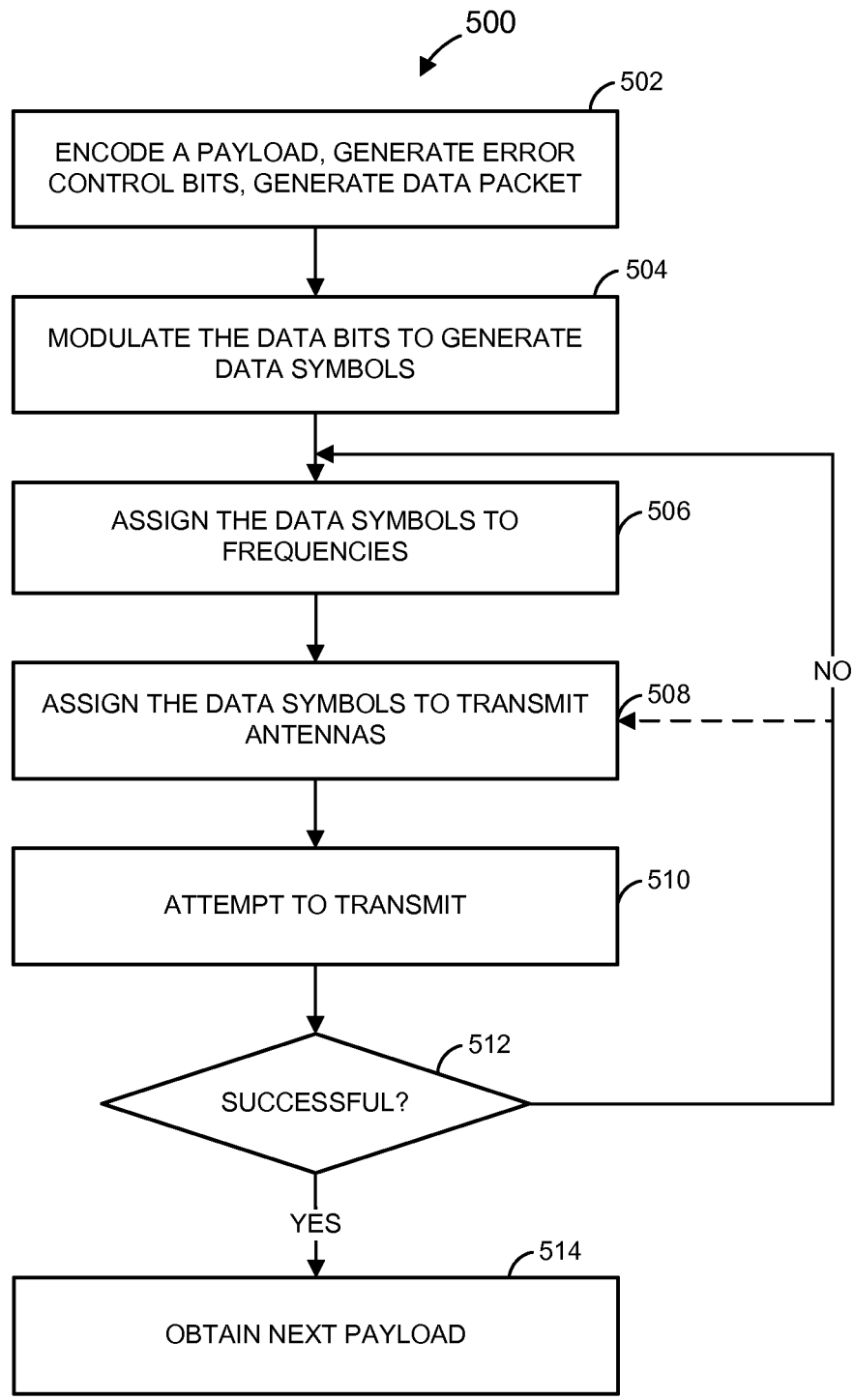
FIG. 6 is a flow diagram of an example method for time-varying symbol vector mapping for chase-combining HARQ.

FIG. 6 is a flow diagram of an example method 500 that a transmitting device such as the transmitting device 102 (see FIG. 1A) or the transmitter 300 (see FIG. 4) may implement in hardware, a processor executing software instructions, a processor executing firmware instructions or a combination thereof to support the time-varying symbol vector mapping techniques discussed above with reference to FIGS. 1A and B, 4, and 5. In block 502, information such as a sequence of bits defining the payload of a data packet (or part of a bit stream, a frame, etc.) may be encoded, and parity or error detection bits may be generated. Referring back to FIG. 4, for example, the encoders 302 and 304 and the bit interleavers 310 and 312 may perform some or all of these steps. Next, the data packet including the payload and the error detection bits may be modulated in any desired manner to generate a sequence of symbols. Each symbol may be of a higher dimension that the input binary data. The modulators 320 and 322 illustrated in FIG. 4, for example, may apply QPSK to map the bits of the data packet to corresponding signal constellation points.

In block 506, the method 500 assigns the symbols to frequencies of respective subcarriers according to a particular mapping pattern known to the receiver. For example, the mapping pattern may be a time-specific or retransmission-count-specific mapping pattern. A transmitter implementing the method 500 may update the mapping pattern upon every failed attempt to deliver the data packet or, alternatively, upon expiration of a predetermined time interval. It will be noted that the subcarriers may be associated with wired or wireless resources. For example, each subcarrier may be associated with a certain carrier frequency on a transmission wire. As discussed above with reference to FIG. 4, a HARQ controller may maintain a count of retransmissions and, in some embodiments, the corresponding mapping patterns. Upon generating the symbol vector mapping, the method 500 allocates specific antennas or similar physical resources to the frequency-mapped symbols (block 508), followed by an attempt to transmit the frequency- and antenna-mapped symbols via the corresponding subcarriers (block 510).

In block 512, the method 500 may receive a positive acknowledgment, a negative acknowledgement, a timer expiration event, or other event indicative of whether the data packet successfully reached its destination. The method 500 continues to retrieve a new payload for the next data packet (block 514) if the transmission attempt was successful. Otherwise, the method 500 returns to the block 506 to generate a new frequency mapping, followed by applying the same or a different spatial mapping in the block 508. In some embodiments, the method 500 returns directly to the block 508 from the block 512 to generate a new spatial mapping without modifying the frequency mapping.

Figure 7:
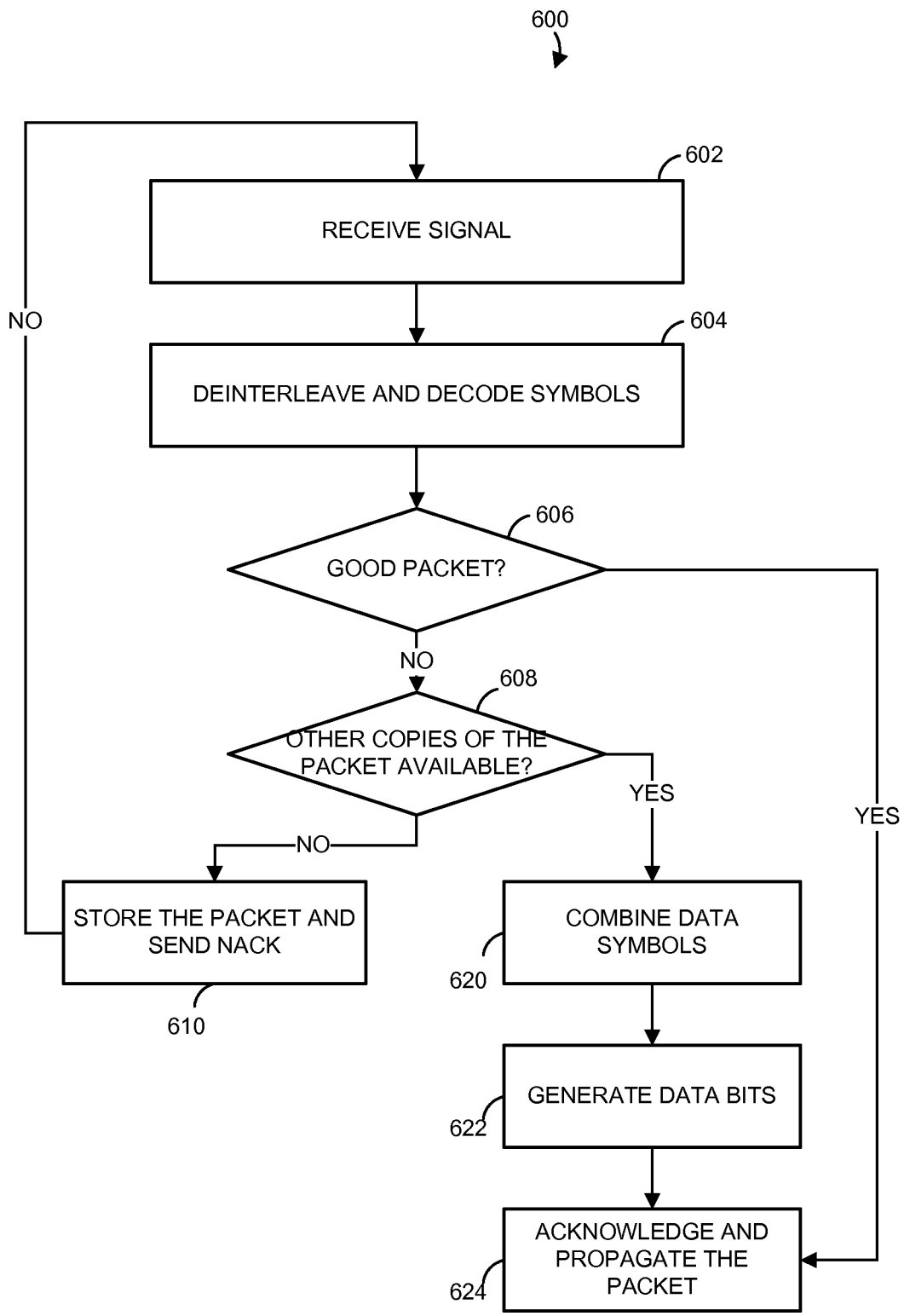
FIG. 7 is a flow diagram of an example method for time-varying symbol vector mapping for chase-combining HARQ.

FIG. 7 illustrates an example method 600 which a receiving device such as the receiving device 106 (see FIG. 1A) or the receiver 340 (see FIG. 4) may implement in hardware, a processor executing software instructions, a processor executing firmware instructions or a combination thereof to support some of the time-varying symbol vector mapping techniques discussed above with reference to FIGS. 1A and B, 4, and 5, and apply Chase-Combining HARQ techniques to attempt to assemble the transmitted data packet. A signal such as the signal $y_1$ discussed above is received in block 602 and decoded in block 604. In some embodiments of a system to which the method 600 is applied, the method 600 processes the received signal using a corresponding time-varying mapping pattern. However, should the transmitter vary only spatial (i.e., symbol-to-antenna) mapping, the block 604 need not apply time-varying mapping patterns at all.

If, in block 606, the method 600 determines that the data packet is correct or at least correctable, the method 600 may generate a positive acknowledgement in block 624 and propagate the packet to a higher level of the packet processing architecture, for example. Otherwise, the method 600 checks whether any previous copies of the data packet are available and whether Chase-Combining may be applied. Referring back to FIG. 4, at least some of the steps corresponding to blocks 602-608 may be implemented in the symbol deinterleaver 342. In block 610, the method 600 stores the received defective copy of the data packet in a memory such as the RAM 356 illustrated in FIG. 4, for example, optionally generates a negative acknowledgement (not shown), and returns to block 602 to wait for a new signal.

When multiple copies of a data packet become available, the method 600 may combine the copies on the symbol level in block 620 using any suitable technique including the LLR approach discussed above or the Maximum Likelihood (ML) algorithm, for example. After Chase-Combining the symbols into an aggregate copy, the method 600 may convert the symbols to data bits (block 622) according to the modulation technique used by the corresponding transmitter (e.g., QPSK).

While the symbol vector mapping techniques were described herein in the context of communication systems that operate according to IEEE 802.11 standards, these techniques may be used in various other types of wireless communication systems that utilize frequency and/or antenna selection. For example, the symbol vector mapping techniques described herein may be utilized in systems that conform to one of the IEEE 802.16 family of standards or the Long Term Evolution (LTE) standard of the Third Generation Partnership Project (3GPP), in MIMO code-division multiple access (CDMA) systems, etc.

Generally regarding the discussion above, it will be understood that the terms "transmitter" and "receiver" merely refer to operational states of physical devices and are not intended to always limit these devices to only receiving or transmitting in the respective communication network. For example, the device 102 in FIG. 1A may operate as a receiver and the device 106 may operate as a transmitter at some point during operation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. An apparatus for transmitting data via a plurality of antennas, the apparatus comprising:
    a space-time encoder configured to map, based on a first antenna mapping, a plurality of symbols to the plurality of antennas for transmitting a first data unit to a receiver;
    a symbol vector interleaver configured to map, based on a first subcarrier mapping, the plurality of symbols to a plurality of subcarriers for transmitting the first data unit; and
    a Hybrid Automatic Repeat Request (HARQ) controller configured to, subsequent to the first data unit being transmitted to the receiver, determine whether the receiver has successfully received the first data unit, wherein in response to the HARQ controller determining that the receiver has not successfully received the first data unit, the HARQ controller is configured to
        (i) cause the space-time encoder to map, based on a second antenna mapping, the plurality of symbols to the plurality of antennas for transmitting a second data unit to the receiver,
        (ii) cause the symbol vector interleaver to map, based on a second subcarrier mapping, the plurality of symbols to the plurality of subcarriers for transmitting the second data unit, wherein the second subcarrier mapping is different than the first subcarrier mapping, and
        (iii) cause the second subcarrier mapping to be communicated to the receiver.

2. The apparatus of claim 1, wherein the second antenna mapping is different than the first antenna mapping.

3. The apparatus of claim 2, wherein the HARQ controller is configured to determine the second subcarrier mapping based on a pre-determined mapping pattern.

4. The apparatus of claim 2, wherein the HARQ controller is configured to determine the second subcarrier mapping based on an algorithm.

5. The apparatus of claim 1, wherein the space-time encoder comprises:
    a vector rotator configured to spatially rotate a symbol vector including the plurality of symbols; and
    a symbol vector mapper configured to map the symbol vector to the plurality of antennas.

6. The apparatus of claim 1, wherein the HARQ controller is configured to determine whether the receiver has successfully received the first data unit by at least one of (i) detecting a timeout event at the apparatus or (ii) detecting a negative acknowledgement transmitted from the receiver.

7. The apparatus of claim 1, wherein the plurality of symbols corresponds to a plurality of bits;
wherein the apparatus further comprises a modulator to generate the plurality of symbols based on the plurality of bits using Quadrature Phase-Shift Keying.

8. The apparatus of claim 1, wherein, according to the second subcarrier mapping, each symbol in the second data unit is mapped to a different subcarrier with respect to the first subcarrier mapping.

9. A method for transmitting data via a plurality of antennas, the method comprising:
mapping, based on a first antenna mapping, a plurality of symbols to the plurality of antennas for transmitting a first data unit to a receiver;
mapping, based on a first subcarrier mapping, the plurality of symbols to a plurality of subcarriers for transmitting the first data unit; and
subsequent to the first data unit being transmitted to the receiver, determining whether the receiver has successfully received the first data unit, and in response to determining that the receiver has not successfully received the first data unit,
(i) mapping, based on a second antenna mapping, the plurality of symbols to the plurality of antennas for transmitting a second data unit to the receiver,
(ii) mapping, based on a second subcarrier mapping, the plurality of symbols to the plurality of subcarriers for transmitting the second data unit, wherein the second subcarrier mapping is different than the first subcarrier mapping, and
(iii) causing the second subcarrier mapping to be communicated to the receiver.

10. The method of claim 9, wherein the second antenna mapping is different than the first antenna mapping.

11. The method of claim 10, further comprising:
determining the second subcarrier mapping based on a pre-determined mapping pattern.

12. The method of claim 10, further comprising:
determining the second subcarrier mapping based on an algorithm.

13. The method of claim 9, further comprising:
determining whether the receiver has successfully received the first data unit by at least one of (i) detecting a timeout event or (ii) detecting a negative acknowledgement transmitted from the receiver.

14. The method of claim 9, wherein mapping, based on the second subcarrier mapping, the plurality of symbols to the plurality of subcarriers includes mapping each symbol in the second data unit to a different subcarrier with respect to the first subcarrier mapping.

15. A nontransitory, tangible computer-readable storage medium storing instructions that, when executed by one or more processors, cause the one or more processors to:
map, based on a first antenna mapping, a plurality of symbols to a plurality of antennas for transmitting a first data unit to a receiver;
map, based on a first subcarrier mapping, the plurality of symbols to a plurality of subcarriers for transmitting the first data unit;
determine whether the receiver has successfully received the first data unit; and
in response to determining that the receiver has not successfully received the first data unit,
(i) map, based on a second antenna mapping, the plurality of symbols to the plurality of antennas for transmitting a second data unit to the receiver,
(ii) map, based on a second subcarrier mapping, the plurality of symbols to the plurality of subcarriers for transmitting the second data unit, wherein the second subcarrier mapping is different than the first subcarrier mapping, and
(iii) cause the second subcarrier mapping to be communicated to the receiver.

16. The computer-readable storage medium of claim 15, wherein the second antenna mapping is different than the first antenna mapping.

17. The computer-readable storage medium of claim 16, wherein the instructions further cause the one or more processors to:
determine the second subcarrier mapping based on a pre-determined mapping pattern.

18. The computer-readable storage medium of claim 16, wherein the instructions further cause the one or more processors to:
determine the second subcarrier mapping based on an algorithm.

19. The computer-readable storage medium of claim 15, wherein the instructions further cause the one or more processors to:
determine whether the receiver has successfully received the first data unit by at least one of (i) detecting a timeout event or (ii) detecting a negative acknowledgement transmitted from the receiver.

20. The computer-readable storage medium of claim 15, wherein the instructions cause the one or more processors to map, based on the second subcarrier mapping, the plurality of symbols to the plurality of subcarriers at least in part by causing the one or more processors to map each symbol in the second data unit to a different subcarrier with respect to the first subcarrier mapping.

* * * * *